(12) United States Patent
Lai et al.

(10) Patent No.: US 11,478,335 B2
(45) Date of Patent: Oct. 25, 2022

(54) ORTHODONTIC APPLIANCE HAVING CONTINUOUS SHAPE MEMORY

(71) Applicant: 3M INNOVATIVE PROPERTIES COMPANY, St. Paul, MN (US)

(72) Inventors: Ming-Lai Lai, Afton, MN (US); Joseph D. Rule, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 38 days.

(21) Appl. No.: 16/907,877

(22) Filed: Jun. 22, 2020

(65) Prior Publication Data

US 2020/0315747 A1   Oct. 8, 2020

Related U.S. Application Data

(62) Division of application No. 15/756,635, filed as application No. PCT/US2016/059909 on Nov. 1, 2016, now abandoned.

(Continued)

(51) Int. Cl.
*A61C 7/00* (2006.01)
*B29C 51/10* (2006.01)
(Continued)

(52) U.S. Cl.
CPC .............. *A61C 7/08* (2013.01); *A61C 7/002* (2013.01); *A61C 9/0006* (2013.01);
(Continued)

(58) Field of Classification Search
CPC ......... A61C 7/08; A61C 7/002; A61C 9/0006; A61C 9/0053; A61C 9/002; A61C 19/003;
(Continued)

(56) References Cited

U.S. PATENT DOCUMENTS 5,017,133 A    5/1991   Miura
5,975,893 A   11/1999   Chishti
(Continued)

FOREIGN PATENT DOCUMENTS

AU   2013205914   6/2013
JP   S63-011148   1/1988
(Continued)

OTHER PUBLICATIONS

International Search Report for PCT International Application No. PCT/US2016/059909, dated Feb. 16, 2017, 4 pages.

(Continued)

*Primary Examiner* — Leith S Shafi

(57) ABSTRACT

Continuous adjustment appliances are provided that can store a large number of geometries that can be successively accessed throughout orthodontic treatment, with each geometry can correspond to an arrangement of the patient's teeth. An appliance according to the present disclosure can be stimulated to transition among the myriad geometries, which can include changes to the overall shape of the appliance as well as the position and geometry of the cavities corresponding to a patient's teeth. Methods of creating the continuous adjustment appliances and methods of treatment using the continuous adjustment appliances are also revealed.

20 Claims, 6 Drawing Sheets

Related U.S. Application Data

(60) Provisional application No. 62/249,749, filed on Nov. 2, 2015.

(51) Int. Cl.
*A61C 7/08* (2006.01)
*A61C 9/00* (2006.01)
*B29C 51/42* (2006.01)
*A61C 13/15* (2006.01)
*B29L 31/00* (2006.01)

(52) U.S. Cl.
CPC ............ *A61C 9/0053* (2013.01); *B29C 51/10* (2013.01); *B29C 51/421* (2013.01); *A61C 9/002* (2013.01); *A61C 19/003* (2013.01); *A61C 2201/007* (2013.01); *B29C 51/426* (2013.01); *B29C 2791/001* (2013.01); *B29L 2031/753* (2013.01)

(58) Field of Classification Search
CPC . A61C 2201/007; B29C 51/10; B29C 51/421; B29C 51/426; B29C 2791/001; B29L 2031/753
See application file for complete search history.

(56) References Cited

U.S. PATENT DOCUMENTS

| | | | |
|---|---|---|---|
| 6,183,248 B1 | 2/2001 | Chishti | |
| 6,227,851 B1 | 5/2001 | Chishti | |
| 6,388,043 B1 | 5/2002 | Langer | |
| 6,394,801 B2 | 5/2002 | Chishti | |
| 6,450,807 B1 | 9/2002 | Chishti | |
| 6,722,880 B2 | 4/2004 | Chishti | |
| 6,739,870 B2 | 5/2004 | Lai | |
| 7,092,784 B1 | 8/2006 | Simkins | |
| 7,134,874 B2 | 11/2006 | Chishti | |
| 7,291,011 B2 | 11/2007 | Stark | |
| 7,354,268 B2 | 4/2008 | Raby | |
| 7,435,083 B2 * | 10/2008 | Chishti | A61C 7/00 433/213 |
| 7,726,968 B2 | 6/2010 | Raby | |
| 7,869,983 B2 | 1/2011 | Raby | |
| 7,905,725 B2 | 3/2011 | Chishti | |
| 8,070,487 B2 | 12/2011 | Chishti | |
| 8,105,080 B2 | 1/2012 | Chishti | |
| 8,194,067 B2 | 6/2012 | Raby | |
| 8,420,000 B2 | 4/2013 | Muratoglu | |
| 8,426,486 B2 | 4/2013 | Muratoglu | |
| 8,439,672 B2 | 5/2013 | Matov | |
| 8,535,580 B2 | 9/2013 | Puttier | |
| 8,758,009 B2 * | 6/2014 | Chen | A61C 7/08 433/8 |
| 8,765,031 B2 | 7/2014 | Li | |
| 9,259,295 B2 | 2/2016 | Christoff | |
| 2002/0137864 A1 | 11/2002 | Tong | |
| 2004/0103905 A1 | 6/2004 | Farrell | |
| 2004/0181003 A1 | 9/2004 | Murakami | |
| 2005/0003318 A1 | 1/2005 | Choi | |
| 2005/0268744 A1 | 12/2005 | Embach | |
| 2006/0099544 A1 | 5/2006 | Lai | |
| 2006/0154195 A1 | 7/2006 | Mather | |
| 2007/0031791 A1 | 2/2007 | Cinader, Jr. | |
| 2007/0244550 A1 | 10/2007 | Eidenschink | |
| 2007/0290167 A1 | 12/2007 | Mather | |
| 2008/0044786 A1 | 2/2008 | Kalili | |
| 2009/0286196 A1 | 11/2009 | Wen | |
| 2010/0049171 A1 | 2/2010 | McQueen | |
| 2010/0086890 A1 * | 4/2010 | Kuo | A61C 7/08 433/6 |
| 2010/0155998 A1 | 6/2010 | Rule | |
| 2010/0260405 A1 | 10/2010 | Cinader, Jr. | |
| 2011/0071271 A1 | 3/2011 | Xie | |
| 2012/0061868 A1 | 3/2012 | Christoff | |
| 2012/0135369 A1 * | 5/2012 | Suchan | A63B 71/085 433/214 |
| 2012/0225600 A1 | 9/2012 | Rule | |
| 2015/0093559 A1 * | 4/2015 | Baer | B29C 48/21 428/212 |
| 2016/0310237 A1 * | 10/2016 | Hung | A61C 7/08 |

FOREIGN PATENT DOCUMENTS

| | | |
|---|---|---|
| JP | H07-213538 | 3/1999 |
| JP | 2009-000555 | 1/2009 |
| WO | WO 2007-084727 | 7/2007 |
| WO | WO 2015-095790 | 6/2015 |
| WO | WO 2016-109660 | 7/2016 |
| WO | WO 2016-148960 | 9/2016 |
| WO | WO 2016-149007 | 9/2016 |

OTHER PUBLICATIONS

Cavicchi, Marcos, Cakmak; Shape Memory Ionomers (2016), Journal of Polymer Science, pp. 1389-1396 (Year: 2016).

Hoeher et al., Tunable Multiple-Shape Memory Polyethylene Blends, 2019, Macromolecular Chemistry and Physics, Issue 23, vol. 214, pp. 2725-2732, 2013.

\* cited by examiner

ORTHODONTIC APPLIANCE HAVING CONTINUOUS SHAPE MEMORY

BACKGROUND

Orthodontics is a specialized area of dentistry concerned with the diagnosis and treatment of dental malocclusions to improve bite function, hygiene, and facial aesthetics. Orthodontic therapy commonly uses appliances called brackets and molar tubes which are bonded to a patient's teeth. Brackets and molar tubes contain slots and passageways, respectively, to accommodate a resilient "U"-shaped wire called an orthodontic archwire. During treatment, the archwire is secured within the slots and passageways of the brackets and molar tubes. While the archwire is initially distorted, it gradually returns to its original shape over the course of treatment, thereby applying therapeutic forces to urge the malpositioned teeth to proper locations.

Another type of orthodontic treatment involves the use of resilient polymeric trays that fit over the teeth of the patient's dental arches. These trays, also known as aligners, alignment shells and polymeric appliances, are provided in a series and are intended to be worn in succession in order to gradually move the teeth in incremental steps toward a desired target arrangement. Some types of polymeric appliances have a row of tooth-shaped cavities for receiving each tooth of the patient's dental arch, and the cavities are oriented in slightly different positions from one appliance to the next in order to incrementally urge each tooth toward its desired target position by virtue of the resilient properties of the polymeric material.

A variety of methods have been proposed for manufacturing polymeric appliances. According to one known method, a digital data file is obtained that represents the patient's upper and lower dental arches at the beginning of treatment. This data file is then analyzed to identify subsets of data, each of which represents one of the patient's teeth. Next, a technician then uses a computer input device (such as a mouse or keyboard) to virtually reposition the maloccluded teeth and move individual teeth on a computer screen relative to each other into desired target positions. The target positions are then reviewed and approved by a treating professional, such as an orthodontist that is located remotely from the technician.

Once the proposed tooth arrangement has been approved, the data representing the initial tooth positions and the data representing the target tooth positions are then used to determine intended intermediate positions of the teeth as the teeth move from initial to target positions. As one example, data representing the differences in tooth positions between the initial tooth arrangement and the target tooth arrangement may be interpolated in order to obtain a series of twenty intermediate positions of the teeth. The data representing those intermediate tooth positions is then stored in memory and subsequently used to make models of the dental arches for each intermediate tooth arrangement.

For example, a data set representing the teeth in a desired target arrangement and twenty data sets representing the teeth in twenty different intermediate arrangements may be used to manufacture a series of twenty-one physical, positive dental arch models for each dental arch using rapid prototyping methods such as stereolithography. Subsequently, a sheet of polymeric material is placed over each of the arch models and formed under heat, pressure and/or vacuum to conform to the model teeth of each model arch. The formed sheet is cleaned and trimmed as needed and the resulting arch-shaped appliance is shipped along with the remaining appliances to the treating professional. The patient is then instructed to wear each appliance over its intended dental arch in sequence for a period of, for example, two or four weeks, after which the used appliances are discarded and the next two appliances in the series for the upper and lower dental arches are to be worn.

SUMMARY OF THE INVENTION

Typical polymeric appliances are configured to store one or two shapes corresponding to different arrangements of the patient's teeth. This requires the patient to continually replace the worn appliance with a subsequent appliance to ensure the application of continued, clinically effective force on the relevant teeth. Such limited shape storage also requires that any given appliance only move the teeth a limited amount (e.g., 0.2 mm), and particularly complicated malocclusion may require an excess number of appliances to treat. In contrast, the present disclosure provides continuous adjustment appliances that can store a large number of geometries that can be successively accessed throughout treatment. Each geometry can correspond to an arrangement of the patient's teeth. An appliance according to the present disclosure can be stimulated to transition among myriad geometries, which can include changes to the overall shape of the appliance as well as the position and geometry of the cavities corresponding to a patient's teeth. This variability allows the patient or practitioner to vary the differences between given successive tooth arrangements to expand or contract the length of time the patient wears a given configuration before needing to transition to the next appliance configuration. In some embodiments, the appliance can be manufactured to store at least 4, at least 6, at least 10, at least 20, and at least 30 distinct appliance geometries. The ability to store multiple geometries in a single appliance is a distinct advantage, as it allows for more iterations of movement between any given tooth orientation. This can have the effect of both making treatment more efficient, in certain implementations, as well as improving comfort for the patient. Appliances of the present disclosure can also be formed from materials that are softer than typically used to create polymeric appliances, which can also lead to an increase in patient comfort and compliance. Furthermore, by requiring fewer appliances to perform the same treatment goals, the continuous adjustment appliances of the present disclosure can reduce the material and manufacturing cost associated with any given treatment.

In one aspect, the present disclosure provides a polymeric shell dental appliance for placement on a dental arch comprising a concave trough having cavities configured to be positioned on a plurality of teeth in the dental arch and having a first approximate shape, wherein the concave trough comprises a crosslinked shape memory polymer, and wherein the crosslinked shape memory polymer is a semicrystalline, non-segmented polymer configured to restore the concave trough to (a) a second approximate shape on application of a first external energy stimulus; and (b) a third approximate shape on application of a second external energy stimulus of a greater magnitude than the first energy stimulus.

In another aspect, the present disclosure provides a method for manufacturing polymeric dental appliances configured to conform to one or more teeth of a patient. The method comprises providing a first positive model of the patient's dentition, the model representing a repositioned arrangement of the patient's teeth and forming over the model at a first molding temperature a sheet of crosslinkable, crystallizable polymeric material having a crystallization temperature range having an upper limit and a lower limit. The method next involves crosslinking the polymer to create an appliance having a first stored geometry. Next, a second model representing a first intermediate arrangement of the patient's teeth is provided, with the arrangement including one or more teeth in different orientations than the first model. The appliance is subjected to a second molding temperature within the crystallization temperature range to create an appliance having a second stored geometry. The method next includes the steps of providing a third model representing a second intermediate arrangement of the patient's teeth, the second arrangement including one or more teeth in different orientations than the first intermediate arrangement, subjecting the appliance to a third molding temperature within the crystallization temperature range to create a third stored geometry, the third molding temperature being less than either the first or second molding temperatures; and cooling the appliance below the lower limit of transition temperature range.

In yet another aspect, the present disclosure provides a method of moving a patient's teeth of a target arrangement. The method includes placing a polymeric dental appliance having a first configuration on a dental arch, the polymeric appliance comprising a crosslinked, semicrystalline shape memory polymer having a number of crosslinks and crystalline structures; heating the appliance to a first transition temperature so as to modify the shape of the appliance to a second configuration. Once the appliance reaches the second configuration, it is placed on the dental arch. Subsequently, the appliance is heated to a second transition temperature so as to modify the shape of the shell to a third configuration. The polymeric appliance in the third configuration is placed on the dental arch, with the third configuration shaped to reposition the patient's teeth to the target arrangement.

As used herein, a "cross-linking polymeric material" means a polymer, for example polyethylene, that can be cross-linked by a variety of approaches, including those employing cross-linking chemicals (such as peroxides and/or silane) and/or irradiation. Preferred approaches for cross-linking employ irradiation.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

While the above-identified figures set forth several embodiments of the disclosure other embodiments are also contemplated, as noted in the description. In all cases, this disclosure presents the invention by way of representation and not limitation. It should be understood that numerous other modifications and embodiments can be devised by those skilled in the art, which fall within the scope and spirit of the principles of the invention.

Directional Definitions

As used herein:

"Mesial" means in a direction toward the center of the patient's curved dental arch.

"Distal" means in a direction away from the center of the patient's curved dental arch.

"Occlusal" means in a direction toward the outer tips of the patient's teeth.

"Gingival" means in a direction toward the patient's gums or gingiva.

"Facial" means in a direction toward the patient's lips or cheeks.

"Lingual" means in a direction toward the patient's tongue.

DETAILED DESCRIPTION OF ILLUSTRATIVE EMBODIMENTS

The present disclosure provides continuous adjustment appliances that can store a large number of geometries that can be successively accessed throughout treatment. Each geometry can correspond to an arrangement of the patient's teeth. In typical treatment, each arrangement of teeth requires the use of a new appliance. In contrast, an appliance according to the present disclosure can be stimulated to transition among myriad geometries, which can include changes to the overall shape of the appliance as well as the position and geometry of the cavities corresponding to a patient's teeth.

Figure 1:
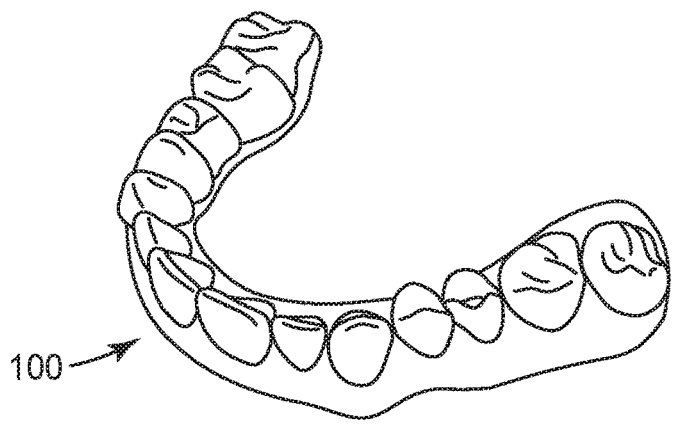
FIG. 1 is an isometric view of a continuous adjustment appliance according to one embodiment of the present disclosure.

One implementation of a continuous adjustment appliance is generally depicted in FIG. 1. The continuous adjustment appliance 100 is removable and replaceable over the teeth. In some embodiments, appliance 100 is one of a plurality of incremental adjustment appliances. The continuous adjustment appliance 100 may comprise a polymeric concave trough having an inner cavity. The inner cavity is shaped to receive and resiliently reposition teeth from one tooth arrangement to a successive tooth arrangement. The inner cavity may include a plurality of receptacles, each of which is adapted to connect to and receive a respective tooth of the patient's dental arch. The receptacles are spaced apart from each other along the length of the cavity, although adjoining regions of adjacent receptacles can be in communication with each other. In some embodiments, the polymeric concave trough fits over all teeth present in the upper jaw or lower jaw. Typically, only certain one(s) of the teeth will be repositioned while others of the teeth will provide a base or anchor region for holding the dental appliance in place as it applies the resilient repositioning force against the tooth or teeth to be repositioned. The continuous adjustment appliances of the present disclosure can also take the form of other polymeric orthodontic appliances typically worn in series, including, for example, the spring aligners and other appliances described in International Publication No. WO2016/109660 (Raby et al.), as well as those described in WO2016/149007 (Oda et al.) and WO2016/148960 (Cinader et al.).

The continuous adjustment appliances can rely on certain shape memory polymer concepts to transition between stages. Shape memory polymers are known to have the unique ability to be set in a pre-set shape, deformed to an altered shape, and then revert back to the pre-set shape when exposed to the appropriate stimuli (e.g., changes in temperature, application of solvent, etc.). When processed according to the methods described therein, orthodontic appliances comprising shape memory polymers can revert back to a plurality of pre-set shapes upon exposure to staged external stimuli. For example, the orthodontic appliance may include a shape memory polymer surface that has been cast or otherwise shaped to have a permanent shape or configuration. As another example, an entire appliance may consist of shape memory polymer storing a plurality of geometries. This surface can be deformed to an altered or deformed shape and then be shifted back or recovered to the permanent shape when appropriately triggered. Triggering the shift from the deformed shape to the permanent shape can vary depending on the particular polymer used or other parameters. However, at least some of the shape memory polymers disclosed herein can be shifted by exposure to elevated temperatures and/or to an appropriate solvent.

Shape memory polymers can be classified as elastomers. On the molecular level they represent polymer networks that include segment chains that are connected by netpoints. The netpoints can be formed by entanglements of the polymer chains or intermolecular interaction of certain polymer blocks. These cross-links are called physical netpoints. Crosslinks in the form of covalent bonds form chemical netpoints. An elastomer exhibits a shape-memory functionality if the material can be stabilized in the deformed state in a temperature range that is relevant for the particular application. This can be achieved by using the network chains as a kind of molecular switch. For this purpose, it should be possible to limit the flexibility of the segments as a function of temperature. The ability to incorporate a control function into the material provides a thermal transition $T_{trans}$ of the network chains in the temperature range of interest for the particular application. At temperatures above $T_{trans}$ the chain segments are flexible, whereas the flexibility of the chains below this thermal transition is at least partially limited. In the case of a transition from the rubber-elastic, i.e., viscous, to the glassy state the flexibility of the entire segment is limited.

SMPs have a defined melting point ($T_m$) or glass transition temperature ($T_g$). Collectively, the melting point ($T_m$) or glass transition temperature ($T_g$) will be referred to as the transition temperature or $T_{trans}$. Above the $T_{trans}$ the polymers are elastomeric in nature, and are capable of being deformed with high strain. The elastomeric behavior of the polymers results from either chemical crosslinks or physical crosslinks (often resulting from microphase separation). Therefore, SMPs can be glassy or crystalline and can be either thermosets or thermoplastics. SMPs particularly useful in the present disclosure are semicrystalline and contain chemical crosslinks.

Without being bound to theory, it is believed that the crystalline domains hold or constrain molecular mobility, so the polymer maintains a deformed shape. Shifting from a deformed shape to the original or permanent shape generally includes mobilizing at least a portion of the crystalline domains of the shape memory polymer in order to allow the polymer to elastically "spring back" or otherwise shift to the original permanent shape. According to this theory, mobilizing is understood to be the mobilization of the crystalline phase through the application of the appropriate external stimuli. Not all of the crystalline domains needs to be mobilized at one time, and progressive increases in temperature can yield multiple intermediate shapes as the polymer transitions from first deformed state to the original or permanent shape. Such selective mobilization provides for the retention of a plurality of shapes in single structure.

SMPs particularly useful in the present disclosure exhibit a relatively broad crystallization temperature range over which the SMP forms a range of crystalline domains. As used herein, the crystallization temperature range refers to a range of temperatures below the $T_{trans}$ in which the SMP exhibits significant crystal growth. The crystallization temperature range is dependent upon, among other factors, the processing and thermal history of the SMP. For example, polyethylene can have a crystallization temperature range of about 60° C. to about 120° C. The crystallization range can also be influenced by the molecular architecture of the polymer. For example, branchpoints in the SMP polymer backbone and comonomer incorporation can decrease the crystallinity overall and depress the crystallization temperature range relative to pure, linear polymer.

In presently preferred implementations, the crystallization temperature range has a lower bound substantially above body temperature (37° C.). In such implementations, the polymer is unlikely to undergo a change in configuration once the appliance is placed on the dental arch. In some or all embodiments, the lower limit of the crystallization temperature range is at least 55° C., at least 60° C., or at least 65° C. Further, the upper boundary of the crystallization temperature range is substantially below the temperature necessary to disrupt crosslinks formed in the SMP. In some or all embodiments, the upper limit of the crystallization temperature range is no greater than 135° C., no greater than 130° C., or no greater than 125° C. The crystallization temperature range of a polymer suitable for use in present disclosure generally overlaps with the melting temperature range of that polymer. In such circumstances, there may be some differences depending on whether crystals are being formed or destroyed according to the methods described herein, but the two ranges are generally interchangeable.

Crystalline structures formed at a plurality of different mold temperatures are useful for storing a plurality of geometries in an appliance of the present disclosure. Crystalline structures formed at the lower bound of the crystallization temperature range can be disrupted when heated above the formation (i.e., molding) temperature reached in creating the crystals, while crystalline structures formed at the higher temperature remain essentially in place. Upon cooling, the remaining crystalline structures can define a new geometry for the appliance.

The permanent, original shape of the SMP is established when the requisite crosslinks are formed during or after an initial molding process. After crosslinking, the SMP can then be deformed from the original shape to a plurality of temporary shapes. The temporary shapes are often set by heating the polymer at a temperature within its crystallization temperature range and deforming the sample, and then holding the deformation in place while the SMP cools. The formation of crystalline structures at the corresponding molding temperature holds one temporary shape. The next and subsequent successive temporary shapes are stored by heating the polymer at progressively lower temperature within the SMP's crystallization temperature range and again deforming the sample into a new geometry, and then holding the deformation in place while the SMP cools. Subsequently, the original shape is recovered by heating the material above the highest molding temperature.

In presently preferred embodiments, the shape memory polymer is a cross-linking semi-crystalline elastomer. Many suitable semi-crystalline polymers for use in the present invention are initially non-crosslinked long chain molecules, including polyethylene (low and high density), ultra-high molecular weight polyethylene, polypropylene, nylon, and ethylene vinyl acetate (EVA) among others. In some cases, polyethylene homopolymer may be preferred due to its appropriate crystallization temperature range and its ability to be readily crosslinked by irradiation. In some embodiments the shape memory polymer composition may be cast into a permanent shape and deformed to a plurality of temporary shapes at a plurality of temperatures below the $T_{trans}$ so that each deformed temporary shape is retained or locked in despite other configurations formed at higher temperatures. When the deformed article is heated above a preset molding temperature, the deformed article will elastically recover a successive shape or permanent shape. The process may be repeated, as described below, at multiple temperatures.

To prepare an appliance having the type of shape memory described, the appliance can be molded and crosslinked to form a permanent shape. The appliance is subsequently deformed into two or more temporary shapes by molding and heating the appliance at a series of temperatures below the $T_{trans}$ in a plurality of modified geometries relative to the original shape. The disparate molding temperatures define a step wise sequence of transitions, creating a crystalline region with a plurality of melt temperatures. The appliance can be returned to any shape in the sequence and ultimately its original permanent shape by heating the object above the molding temperature of the preceding appliance geometry in the sequence or $T_{trans}$. In other embodiments, a solvent such as alkyl alcohol, acetone, etc. can partially dissolve or plasticize the crystalline phase of thermoplastic SMPs and cause the same recovery.

Figure 2:
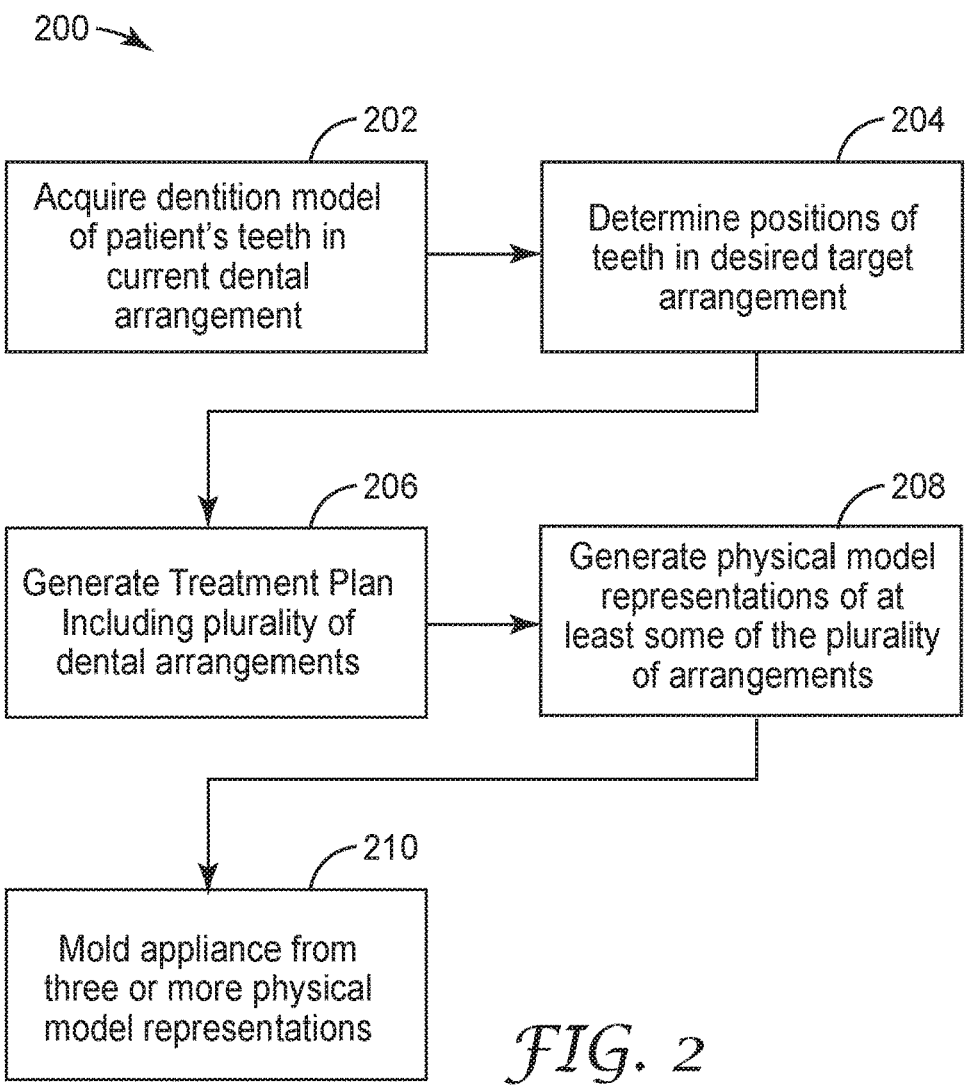
FIG. 2 is a flowchart of a process for designing and manufacturing a continuous adjustment appliance according to the present disclosure.

Referring to FIG. 2, a method 200 of creating a continuous memory appliance according to the present disclosure is illustrated. Individual aspects of the process are discussed in further detail below. The process includes generating a treatment plan for repositioning a patient's teeth. Briefly, a treatment plan will include obtaining data comprising an initial arrangement of the patient's teeth (Step 202), which typically includes obtaining an impression or scan of the patient's teeth prior to the onset of treatment. The treatment plan will also include identifying a final or target arrangement of the patient's teeth that is desired (Step 204), as well as a plurality of planned successive or intermediary tooth arrangements for moving the teeth along a treatment path from the initial arrangement toward the selected final or target arrangement (206). A series of physical model representations of the successive tooth arrangements (up to and including the target arrangement) are then created based on the treatment plan (Step 208). An appliance can be generated based on three or more of the positive dental model representations and administered to the patient (Step 210).

A continuous adjustment appliance can be designed and/ or provided as a single appliance or as part of a set or plurality of appliances. Each appliance or appliance configuration may be configured so a tooth-receiving cavity has a geometry corresponding to an intermediate or final tooth arrangement intended for the appliance. The patient's teeth can be progressively repositioned from an initial tooth arrangement to a target tooth arrangement by modifying the geometry of the continuous adjustment appliance (e.g., the tooth-receiving cavity geometry) over the patient's teeth. A target tooth arrangement can be a planned final tooth arrangement selected for the patient's teeth at the end of all planned orthodontic treatment. Alternatively, a target arrangement can be one of many intermediate arrangements for the patient's teeth during the course of orthodontic treatment. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages. The appliances can be generated all at the same time or in sets or batches. The patient wears each appliance for a fixed length of time as instructed by their prescribing doctor. A plurality of different appliance configurations can be designed and fabricated prior to the patient wearing the appliance or any appliance of the series of appliances according to methods further specified below. After wearing an appliance configuration for an appropriate period of time, the patient replaces the current appliance configuration with the next appliance configuration or next appliance in the series until the prescribed or desired number of appliances in the series have been worn. Additional series of appliances may be fabricated and worn until a satisfactory treatment outcome is achieved.

An adjustment appliance can generated at the beginning of the treatment as an individual appliance or part a series of appliances, and the patient wears the appliance until the pressure of the appliance on the teeth can generally no longer be felt. At that point, the patient replaces the current adjustment appliance with the next appliance configuration (e.g., the successive stored geometry in the current appliance or a new appliance) in the series until no more appliance configurations remain. The final appliance or several appliances in the series may have a geometry or geometries selected to overcorrect the tooth arrangement, i.e., have a geometry which would (if fully achieved) move individual teeth beyond the tooth arrangement which has been selected as the "final." Such overcorrection may be desirable in order to offset potential relapse after the repositioning method has been terminated, i.e., to permit some movement of individual teeth back toward their precorrected positions. Overcorrection may also be beneficial to speed the rate of correction, i.e., by having an appliance with a geometry that is positioned beyond a desired intermediate or final position, the individual teeth will be shifted toward the position at a greater rate. In such cases, the use of an appliance can be terminated before the teeth reach the positions defined by the appliance.

Generating the Treatment Plan

Figure 3:
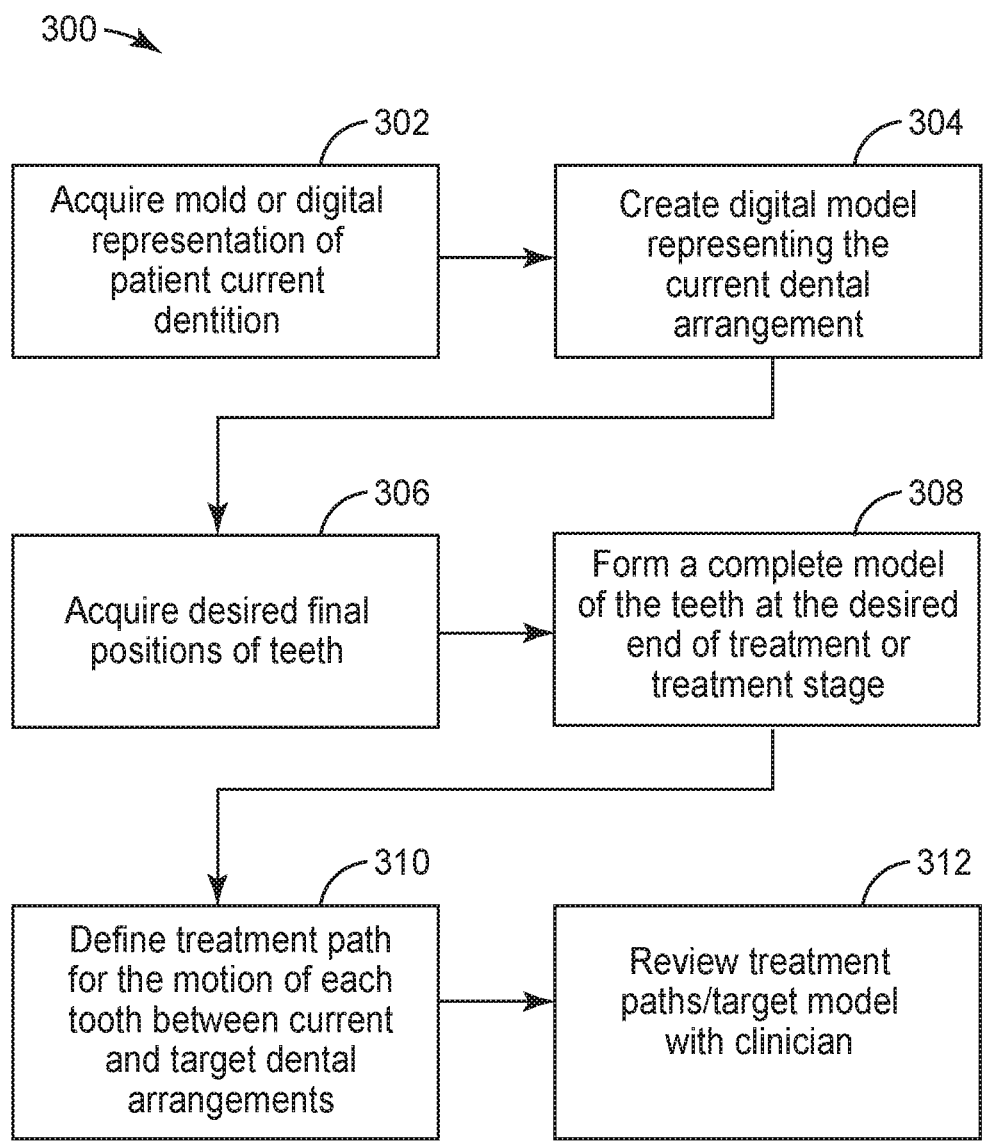
FIG. 3 is a flowchart of a process for specifying a treatment plan leveraging the adjustment appliances of the present disclosure.

FIG. 3 illustrates the general flow of an exemplary process 300 for defining and generating a treatment plan, including repositioning appliances for orthodontic treatment of a patient. The steps of the process can be implemented as computer program modules for execution on one or more computer systems. Systems and methods for generating a treatment plan can be found, for example, in U.S. Pat. No. 7,435,083 (Chisti et al.), U.S. Pat. No. 7,134,874 (Chisti et al.), U.S. Patent Publication Nos. 2009/0286196 (Wen et al.); 2010/0260405 (Cinader) and U.S. Pat. No. 9,259,295 (Christoff et al.).

As an initial step, a mold or a scan of patient's teeth or mouth tissue is acquired (Step 302). This generally involves taking casts of the patient's teeth and gums, and may in addition or alternately involve taking wax bites, direct contact scanning, x-ray imaging, tomographic imaging, sonographic imaging, and other techniques for obtaining information about the position and structure of the teeth, jaws, gums and other orthodontically relevant tissue. A digital data set is derived from this data that represents an initial (e.g., pretreatment) arrangement of the patient's teeth and other tissues. A computer model of the arch may then be re-constructed based on the scan data.

One exemplary technique is digital scanning. A virtual dental model representing the patient's dental structure can be captured using a digital intraoral scan or by digitally scanning an impression or dental model. The digital images may be provided using a hand-held intra-oral scanner such as the intra-oral scanner using active wavefront sampling developed by Brontes Technologies, Inc. (Lexington, Mass.) and described, e.g., in PCT Publication No. WO 2007/084727 (Boerjes et al.). In one or more embodiments, other intra-oral scanners or intra-oral contact probes may be used.

As another option, the digital structure data may be provided by scanning a negative impression of the patient's teeth. As still another option, the digital structure data may be provided by imaging a positive physical model of the patient's teeth or by using a contact probe on a model of the patient's teeth. The model used for scanning may be made, for example, by casting an impression of a patient's dentition from a suitable impression material such as alginate or polyvinylsiloxane (PVS), pouring a casting material (such as orthodontic stone or epoxy resin) into the impression, and allowing the casting material to cure. Any suitable scanning technique may be used for scanning the model, including X-ray radiography, laser scanning, computed tomography (CT), magnetic resonance imaging (MRI), and ultrasound imaging. Other possible scanning methods are described, e.g., in U.S. Patent Application Publication No. 2007/0031791 (Cinader, et al.).

The initial digital data set, which may include both raw data from scanning operations and data representing surface models derived from the raw data, can be processed to segment the tissue constituents from each other (Step 304), including defining discrete dental objects. For example, data structures that digitally represent individual tooth crowns can be produced. In some embodiments, digital models of entire teeth are produced, including measured or extrapolated hidden surfaces and root structures.

Desired final positions of the teeth, or tooth positions that are desired and/or intended end result of orthodontic treatment, can be received, e.g., from a practitioner in the form of a descriptive prescription, can be calculated using basic orthodontic prescriptions, or can be extrapolated computationally from a clinical prescription (Step 306). With a specification of the desired final positions of the teeth and a digital representation of the teeth themselves, the final position and surface geometry of each tooth can be specified (Step 308) to form a complete model of the teeth at the desired end of treatment or treatment stage. The result of this step is a set of digital data structures that represents a desired and/or orthodontically correct repositioning of the modeled teeth relative to presumed-stable tissue. The teeth and surrounding tissue can both be represented as digital data. Further details on software and processes that may be used to derive the target dental arrangement are disclosed, e.g., in U.S. Pat. No. 6,739,870 (Lai et al.), and U.S. Pat. Nos. 8,194,067; 7,291,011; 7,354,268; 7,869,983 and 7,726,968 (Raby et al.).

Having both a beginning position and a final target position for each tooth, the process next defines a treatment path or tooth path for the motion of each tooth (Step 310). This includes defining a plurality of planned successive tooth arrangements for moving teeth along a treatment path from an initial arrangement to a selected final arrangement. In one embodiment, the tooth paths are optimized in the aggregate so that the teeth are moved in the most efficient and clinically acceptable fashion to bring the teeth from their initial positions to their desired final positions.

A movement pathway for each tooth between a beginning position and a desired final position may be calculated based on a number of parameters, including the total distance of tooth movement, the difficulty in moving the teeth (e.g., based on the surrounding structures, the types and locations of teeth being moved, etc.) and other patient-specific data that may be provided. Based on this sort of information, a user or a computer program may generate an appropriate number of intermediary steps (corresponding to a number of treatment steps). In some variations, the user may specify a number of steps, and the software can map different appliance configurations accordingly. Alternatively, the movement pathway may be guided by (or set by) the user.

If the movement path requires that the teeth move more than a predetermined amount (e.g., 0.3 mm or less in X or Y translation), then the movement path may be divided up into multiple steps, where each step corresponds to a separate target arrangement. The predetermined amount is generally the amount that an appliance or appliance configuration can move a tooth in a particular direction in the time required for each treatment step. Each appliance configuration corresponds to a planned successive arrangement of the teeth, and represents a step along the treatment path for the patient. For example, the steps can be defined and calculated so that each discrete position can follow by straight-line tooth movement or simple rotation from the tooth positions achieved by the preceding discrete step and so that the amount of repositioning required at each step involves an orthodontically optimal amount of force on the patient's dentition. As with other steps, this calculation step can include interactions with the practitioner (Step 312).

At various stages, the process can include interaction with a practitioner responsible for the treatment of the patient (Step 312). Practitioner interaction can be implemented using a client process programmed to receive tooth positions and models, as well as path information from a server computer or process in which other steps of process 300 are implemented. In some or all embodiments, the treatment planning described with respect to FIG. 3 may be embodied within a computer-readable storage medium, such as a computer-readable storage medium of clinician's computing device and/or manufacturer's computer, or both. The computer-readable storage medium stores computer-executable instructions that, when executed, configure a processor to perform the model preparation and treatment planning techniques described above.

A completed treatment plan for use in manufacturing the appliances of the present includes a plurality of successive arrangements between an initial arrangement and the desired final arrangement. The plurality of successive dental arrangements may be incorporated into a single appliance or apportioned between multiple appliances to be worn in series. Accordingly, a suitable treatment plan identifies a number of appliances in an acceptable series, as well as a target arrangement and a commencing arrangement for each appliance in the series. A plurality of planned, successive arrangements may be stored between the target and the commencing arrangements. As defined herein, the "target arrangement" may be a desired final dental arrangement or a planned successive dental arrangement the patient should reach after treatment with the appliance. In contrast, the "commencing arrangement" is the dental arrangement the appliance is configured to represent when the appliance is first placed in the patient's mouth. As such, it is closest in orientation to the initial or current arrangement of the patient's teeth, and in some embodiments represents the current arrangement.

Manufacturing the Appliance

Continuous memory appliances can be formed by incorporating a plurality of planned successive tooth arrangements into a single appliance structure. While typical appliances are formed in stages progressing from the patient's current arrangement to a target arrangement, the continuous memory appliances of the present disclosure are initially formed to approximate the target tooth arrangement. Additional shapes are added to the appliance in regressive fashion, working backward from the target arrangement to the commencing arrangement of the treatment plan. By manufacturing the appliances in this way, the patient or practitioner may unlock the next phase of treatment by triggering a change in the shape of the appliance from the commencing arrangement to the next successive arrangement until the target arrangement is reached.

Figure 4:
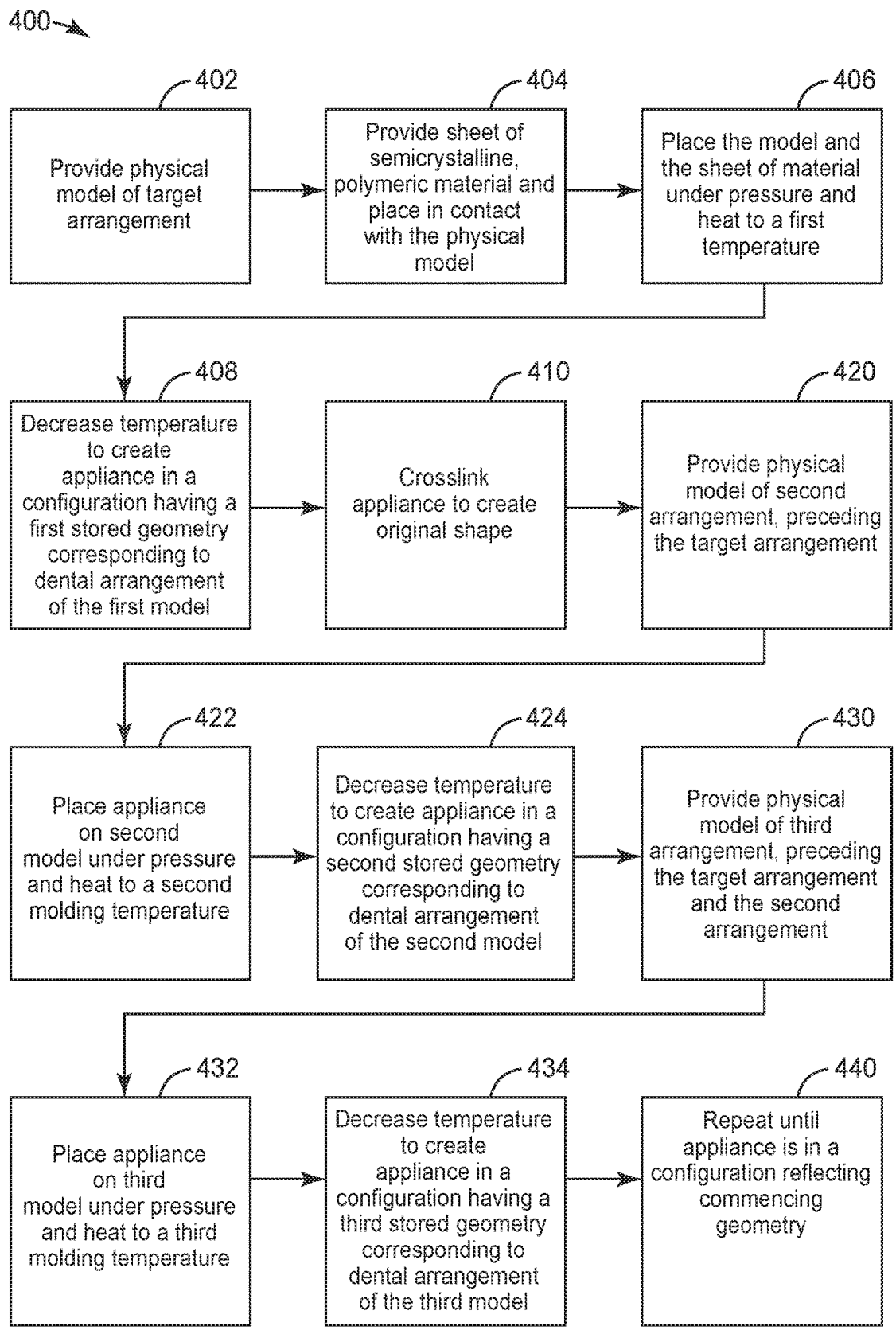
FIG. 4 is a flowchart of a process for manufacturing a continuous adjustment appliance based on a plurality of dental arrangements according to the present disclosure.

A general process 400 for creating a continuous memory appliance is illustrated in FIG. 4. One, some, or all of the steps of method 400 may be performed in a temperature and pressure controlled chamber. At the outset, a physical, dental model of the patient's teeth in a target arrangement is provided (Step 402). A sheet of semicrystalline polymeric material is provided and placed over the dental model. (Step 404). At this stage, the semicrystalline, polymeric material is substantially non-crosslinked. The model and the sheet of material are placed under a first pressure and heated to a first temperature near, but preferably below, the melt temperature of the polymer (Step 406). The combination of heat and pressure/or vacuum causes the material to soften. The model and sheet are maintained at the first temperature and pressure until such time as the sheet has conformed to the shape and orientation of the dental model and crystalline structures in the polymer have melted. The temperature is subsequently decreased (preferably isobarically) to create a shell appliance in a configuration having a first stored geometry corresponding to the dental arrangement of the first model (Step 408). The shell appliance is subsequently crosslinked, in presently preferred circumstances using ionizing radiation. (Step 410). The crosslinked shell in a configuration having the first stored geometry now represents the original shape of the appliance.

In some embodiments, the polymeric material is heated to a temperature above the upper range of its crystallization temperature and potentially above the $T_{trans}$, for example, about 120° C., about 130° C., about 140° C., during the forming process of Step 406. Preferably, the first temperature is below the melting temperature of the semicrystalline polymeric material, typically about 25° C. below to about 0.5° C. below. However, various temperatures and times may be utilized.

In some embodiments, the pressure applied is greater than 10 kPa, e.g., greater than 50 kPa, 75 kPa, 100 kPa, 125 kPa, or greater than 150 kPa. In some embodiments, the pressure is maintained for greater than 30 seconds, e.g., greater than 45 seconds, 60 seconds, 2.5 minutes, 5.0 minutes, 10 minutes, 20 minutes, 30 minutes, 60 minutes, greater than 90 minutes, or even greater than 120 minutes, before release of pressure back to nominal atmospheric pressure. The pressure may be applied by direct force on the polymeric material and/or vacuum.

A first plurality of crystalline structures are formed in the polymeric material as the temperature is reduced from first molding temperature to a subsequent temperature (e.g., room temperature) in step 408. The crystalline structures formed hold the appliance in the first stored geometry prior to irradiation or other suitable method of creating crosslinks in the polymeric material. In some or all embodiments, the temperature is gradually reduced. In other embodiments, appliance may be quenched by rapid reduction in temperature. In any event, it is presently preferred that the parameters selected remain consistent for each relevant step in the process. For example, the rate of temperature reduction could be in the range of about 0.5° C. to about 10° C. per minute, but is typically held at the same rate within the range for each temperature reduction step in the process 400.

Irradiation, if used to crosslink the material, can be done at room temperature or at elevated temperatures typically below the first molding temperature. Irradiation can be performed in air, in vacuum, or in oxygen-free environment, including inert gases such as nitrogen or noble gases. Irradiation can be performed by using electron-beam, gamma irradiation, or x-ray irradiation. In some embodiments, an ionizing radiation (e.g., an electron beam, x-ray radiation or gamma radiation) is employed to crosslink the non-segmented, polymeric material. In specific embodiments, gamma radiation is employed to crosslink the substantially non-crosslinked polymeric material. In some embodiments, the irradiating (with any radiation source) is performed until the sample receives a dose of at least 0.25 Mrad (2.5 kGy), e.g., at least 1.0 Mrad (10 kGy), at least 2.5 Mrad (25 kGy), at least 5.0 Mrad (50 kGy), or at least 10.0 Mrad (100 kGy). In some embodiments, the irradiating is performed until the sample receives a dose of between 1.0 Mrad and 6.0 Mrad, e.g., between 1.5 Mrad and 4.0 Mrad.

In other embodiments, the appliance is treated to create chemical crosslinks using methods known in the art. For example, peroxides can be added to the polymer, and the polymer can be maintained at an elevated temperature after forming into the first stored geometry to allow the peroxides to react. In addition, silanes can be grafted to a polymer backbone, such as polyethylene, and the polymer can be crosslinked upon exposure to a hot, humid environment.

The thickness of the semicrystalline polymer sheet is chosen to provide a clinically appropriate thickness of the material in the resultant appliance. The thickness of the material should typically be selected such that the memory appliance is stiff enough to apply sufficient force to the teeth, but remains thin enough to be comfortably worn. The thickness of the walls of the appliance may be between 0.05 mm and 2 mm, or between 0.1 mm and 1 mm.

Referring again to FIG. 4, a second physical, dental model of the patient's teeth in a least one successive arrangement from the patient's treatment plan is provided (Step 420). The second arrangement includes a least one tooth in a different position or orientation than the same tooth in the first model. The second dental model is a second storable geometry representing an arrangement of the patient's teeth between the initial arrangement and the first arrangement, and includes teeth in positions or orientations between the target arrangement and initial arrangement. Starting from the initial arrangement of the patient's teeth, the second dental model actually precedes the first dental model in that the patient's teeth, during treatment with the appliance, will reach the second arrangement prior to arriving at the first arrangement.

The appliance, still reflecting the first model arrangement, is secured on the second dental model, and the model and the appliance are placed under pressure and heated to a second molding temperature (Step 422). The model and appliance are maintained at the second molding temperature and pressure for a period of time. The temperature is decreased (preferably isobarically) to create an appliance having a second stored geometry corresponding generally to the dental arrangement represented by the second model (Step 424).

Heating the appliance to the second molding temperature disrupts at least a portion of the crystalline structures formed during the molding of the appliance in the first geometry. The second molding temperature is selected so that the appropriate number of these crystallites are destroyed. The second molding temperature can be the same or different (i.e., cooler or hotter) than the first molding temperature. Typically, the second molding temperature is cooler than the first molding temperature. In such embodiments, the second molding temperature is at least 1, at least 2, at least 3, at least 4, at least 5° C. less than the first molding temperature. In other embodiments, the second molding temperature is no more than 10, no more than 5, and no more than 2° C. warmer than the first molding temperature. In certain embodiments, the second molding temperature is between 100 and 120° C.

A second plurality of crystalline structures are formed in the polymeric material as the temperature is reduced from second molding temperature to a subsequent temperature (e.g., room temperature). The crystalline structures formed hold the appliance in the second stored geometry.

Next, a third stored geometry is created in the appliance. A third physical, dental model of the patient's teeth in a preceding successive arrangement from the patient's treatment plan is provided (Step 430). The third arrangement includes a least one tooth in a different position or orientation than the same tooth in the second model. The third dental model provides a third storable geometry representing an arrangement of the patient's teeth between the initial arrangement and the second arrangement. The third dental model actually precedes the second dental model in that the patient's teeth, during treatment with the appliance, will reach the third arrangement prior to arriving at the second arrangement.

The appliance, now reflecting the second model arrangement, is secured on the third dental model, and the model and the appliance are placed under pressure and heated to a third molding temperature cooler than the second molding temperature (Step 432). The model and appliance are maintained at the third molding temperature and pressure for a period of time. The temperature is decreased (preferably isobarically) to room temperature to create an appliance having a third stored geometry corresponding to the shapes and orientations of teeth in the third dental model (Step 434).

In some or all embodiments, the third molding temperature is at least 4, at least 6, at least 7, at least 8, at least 9, and at least 10° C., at least 15° C. less than the second molding temperature. In certain embodiments, the third molding temperature is between 90 and 100° C. A third plurality of crystallites are formed in the polymeric material as the temperature is reduced from third molding temperature to a subsequent temperature (e.g., room temperature). The crystalline structures formed hold the appliance in the third stored geometry until triggered according to methods discussed below. An insufficiently large gap in second and third molding temperatures (and between any subsequent molding temperatures) can have two consequences for continuous memory appliances: 1) a user or practitioner may inadvertently transition the appliance to a subsequent geometry by heating above the requisite molding temperature and 2) the desired arrangement may not be adequately stored in the appliance, as an adequate portion of crystallites are not retained during the corresponding formation.

If the third arrangement is the desired commencing arrangement of the patient's treatment plan, then the molding process may be finished (Step 440). If not, the process 400 of storing geometries corresponding to different dental arrangements in an appliance can be repeated as many times as desired until the commencing arrangement is stored in the appliance. One skilled in the art may vary the differences between given successive tooth arrangements to expand or contract the length of time the patient wears a given configuration before needing to transition to the next appliance configuration. In some embodiments, the appliance can be manufactured to store at least 4, at least 6, at least 10, at least 20, and at least 30 distinct appliance geometries.

Dental models representing the target and successive dental arrangements can be fabricated by manually forming, sectioning, and re-assembling a physical dental casting. If the target dental arrangement is defined as an intermediate or final arrangement, then this casting may be sectioned into individual model tooth elements, and the tooth elements can be rearranged to form the desired dental arrangement. Further, the tooth elements can be waxed back together to provide the dental model.

Digital techniques can also be used. For example, a final dental arrangement can be determined using a computer algorithm or input from a treating professional in a treatment plan as described above, and one or more intermediate dental arrangements derived by sub-dividing the treatment into a series of discrete steps can be created. In one or more embodiments, one or more of the dental arrangements can include a reduced image as is described, e.g., in U.S. Patent Publication No. 2010/0260405 (Cinader). Once each intermediate or final dental arrangement has been derived, respective dental models may be directly fabricated using rapid prototyping methods. Examples of rapid prototyping techniques include, but are not limited to, three-dimensional (3D) printing, selective area laser deposition or selective laser sintering (SLS), electrophoretic deposition, robocasting, fused deposition modeling (FDM), laminated object manufacturing (LOM), stereolithography (SLA) and photo-stereolithography. These and other methods of forming a positive dental model from scanned digital data are disclosed, e.g., in U.S. Pat. No. 8,535,580 (Cinader).

In one or more embodiments, the dental model can also be a reconfigurable dental model, thereby allowing individual teeth models to be rearranged without sectioning. Examples of reconfigurable dental models are described, e.g., in U.S. Pat. No. 6,227,851 (Chishti et al.), U.S. Pat. No. 6,394,801 (Chishti et al.), and U.S. Pat. No. 9,259,295 (Christoff et al.). The reconfigurable dental model may be manually controlled (e.g., relying on a technician or other user to reposition individual teeth) or computer controlled. Use of a computer controlled reconfigurable dental model can be particularly advantageous in certain circumstances, as the individual teeth can be moved at a deliberate rate during the forming process as described in more detail below.

Figure 5:
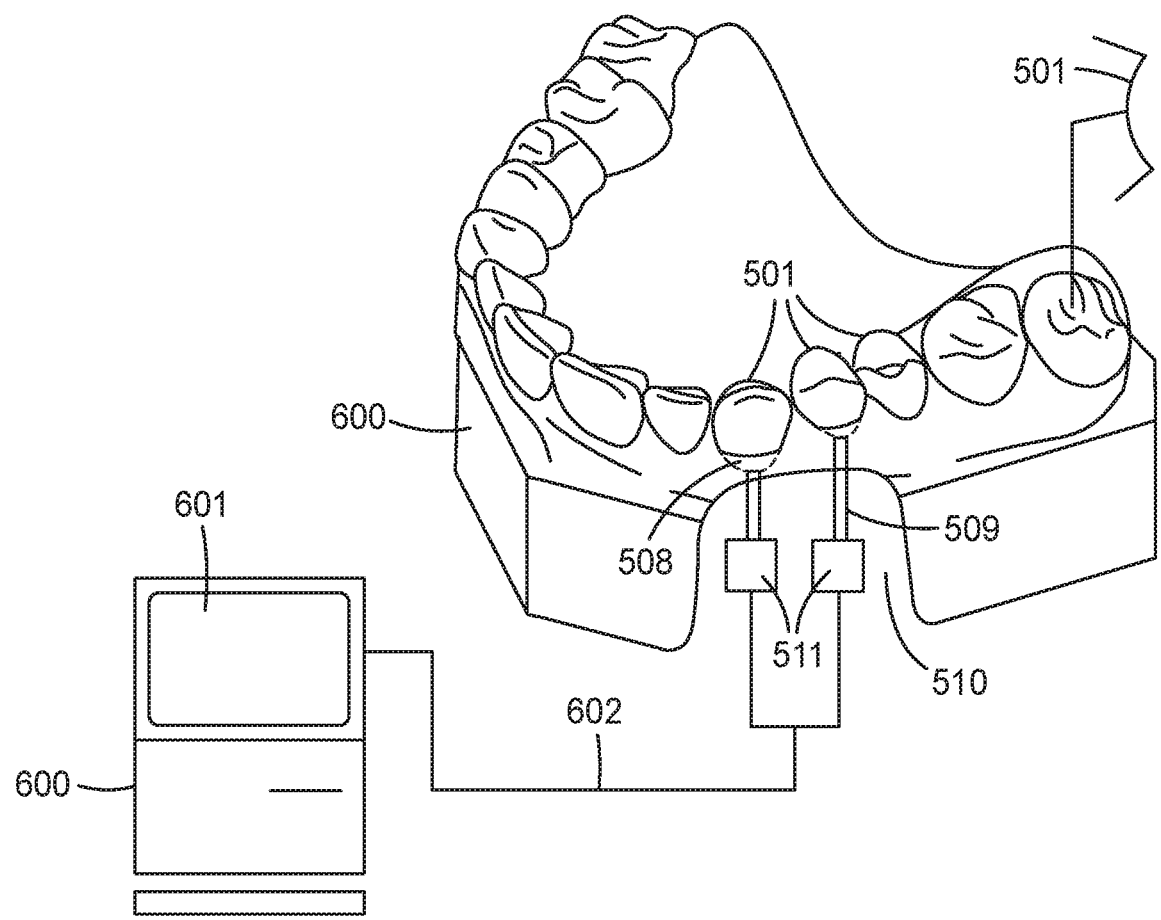
FIG. 5 is a perspective view of a system for making an adjustment appliance in accordance with one embodiment of the disclosure.

In one embodiment of the present invention, a single dental model system is manipulated and reconfigured to model different tooth configurations by controlling the movement of at least some of the individual tooth members, or groups of members, with manipulation mechanisms. Referring to FIG. 5, a simplified illustration of such a reconfigurable dental mold 500 for the fabrication of dental appliances is shown. In this illustration, the mold 500 is a positive representation of the tooth configuration and dental arch of the lower jaw. The tooth configuration is created by the placement and alignment of tooth members 501. The individual tooth members 501 are typically produced to resemble the individual shape of each of the patient's teeth.

The tooth members 501 are supported by a frame 502, which can house manipulation mechanisms for controlling the position and orientation of the tooth members within the arch. The tooth members 501 and frame 502 of the dental model system may be produced manually or with the use of digital imaging and computer controlled molding systems.

The frame houses one or more manipulation devices 511 which manipulate the tooth members 501. Once coupled to the manipulation devices 511, the tooth members 501 can be actuated and repositioned. The manipulation device 511 can be a single mechanism, linked simultaneously to each individual tooth member 501 or group of members using, for example, a series of mechanical linkages. Optionally, the tooth members 501 can be actuated by a combination of manipulation devices each providing some degree of manipulation within a given coordinate system.

The manipulation devices 511, which create the actual six degree of freedom movement of the tooth members 501, may be controlled manually and/or with the use of a microprocessor. In one embodiment, the repositioning of the individual tooth members 501 involves at least some of the components of manipulation device 511 being manually operated. In this embodiment, the practitioner will manually actuate each control mechanism, usually with finger pressure, which will in turn actuate the inner components of the manipulation device until a desired tooth arrangement is produced. Likewise, manual operation may be assisted with the visual aide of computer graphics or with instructions provided by software code.

In presently preferred embodiments, manipulation of manipulation devices 511 can be performed using a computer 600 or a workstation having a suitable graphical user interface (GUI) 601. In a specific example shown in FIG. 5, computer 600 is electrically coupled to manipulation device 511 to enable computer generated instructions to be sent to manipulation devices 511 via appropriate computer coupling methods, represented as line 602. The manipulation of tooth members 501 is driven using software appropriate for viewing and modifying the images (see above) on the GUI 601, as well as directing and controlling the tooth movements according to the treatment plan.

When using the reconfigurable dental mold 500 to produce one or a series of continuous memory appliances for orthodontic treatment, the mold 500 may be manipulated through a series of tooth configurations representing a planned successive arrangement and a corresponding stage in orthodontic treatment. As described previously, the initial tooth configuration is represented by digital information and is introduced to computer 600 for manipulation of the mold 500. Once the user is satisfied with the final arrangement of teeth, the final tooth arrangement is incorporated into a final digital data set. Based on one or more of the data sets, and optionally user input, a plurality of intermediate, successive digital data sets are generated to correspond to successive intermediate tooth arrangements and stored in medium accessible to computer 600.

The user of the reconfigurable mold may then direct the software to send an instruction to a manipulation device 611 to direct a tooth member 601 to move to a position which corresponds to a position digitally represented in a planned successive data set or target data set. After the tooth members 601 are each manipulated and arranged to correspond to the data, the dental model system can be used to fabricate the continuous memory appliance.

In certain embodiments of the process 400 for creating a continuous memory appliance, the dental models are provided in discrete stages. In such embodiments, the appliance may be removed from the corresponding dental model after each cooling step. The dental model of arrangement (n) is then replaced with a distinct dental model of a preceding intermediate arrangement of the treatment plan (n−1), or the tooth members in a reconfigurable dental model are manipulated and arranged to correspond to the preceding, planned successive arrangement (n−1). Once the dental model representing the preceding, planned arrangement is so provided, the appliance is placed over the new arrangement and a new plurality of crystallites are formed.

Figure 6:
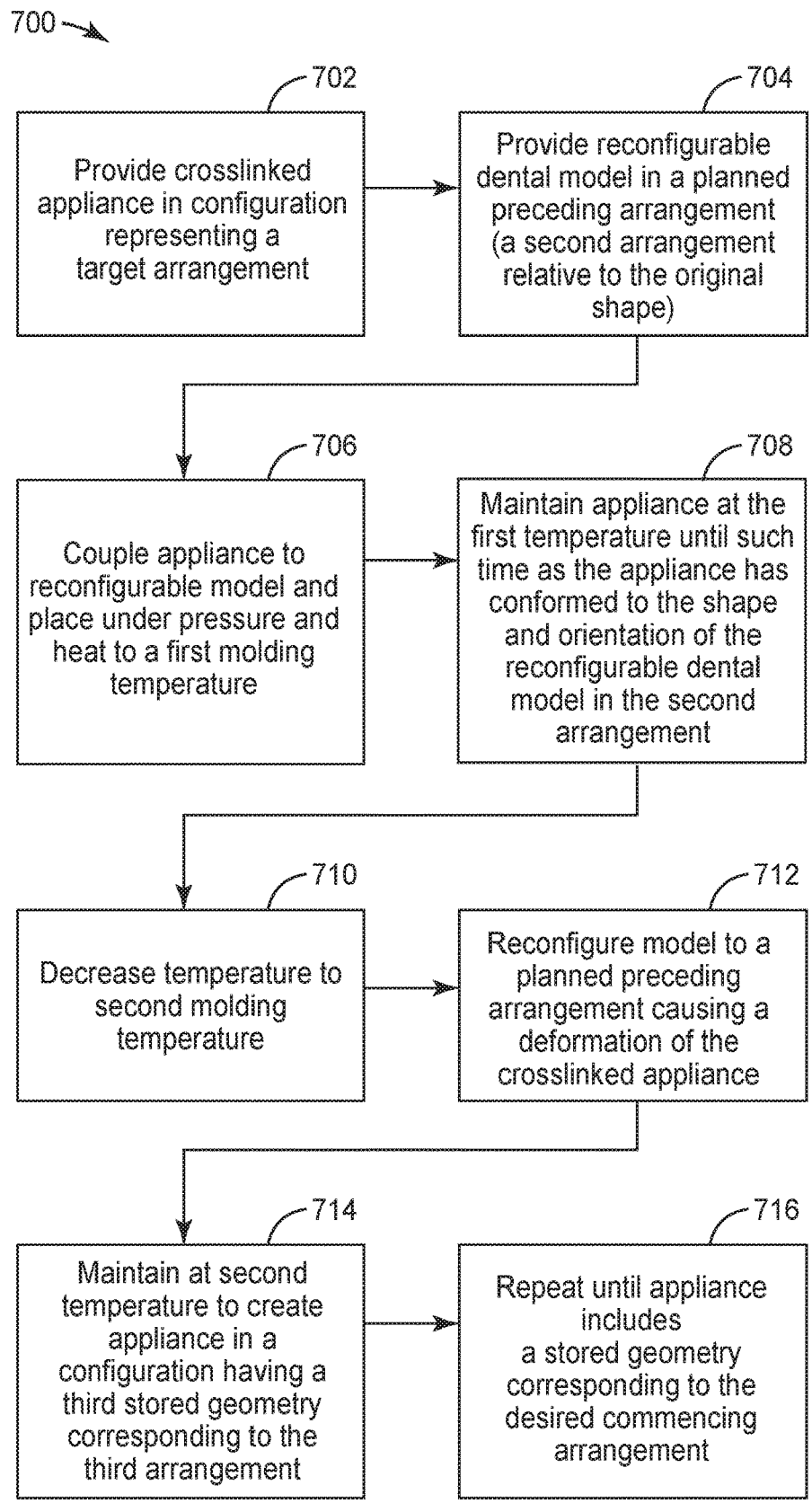
FIG. 6 is a flowchart of a process for manufacturing a continuous adjustment appliance using the system of FIG. 5.

Alternatively, and in presently preferred embodiments, the appliance structure is kept in contact with a reconfigurable dental mold throughout the duration of the process for storing treatment geometries, as set out as process 700 in FIG. 6. In such embodiments, the polymeric material is kept under pressure as the dental mold is reconfigured to each desired dental arrangement. Typically, the appliance is first configured to represent the target arrangement and crosslinked to set the original shape before storing the desired series of successive arrangements (Step 702). This initial configuration can be done on the reconfigurable dental mold or a static mold (e.g., as used in process 400 above). A reconfigurable dental mold of a planned preceding arrangement (a second arrangement relative to the original shape) is provided (Step 704). The reconfigurable model in the second arrangement and the crosslinked appliance in the original shape are placed under pressure and heated to a first molding temperature (Step 706). The model and appliance are maintained at the first temperature until such time as the sheet has conformed to the shape and orientation of the dental model in the second arrangement (Step 708). The temperature is decreased (preferably isobarically) to a second molding temperature (Step 710). The mold is then reconfigured to a planned preceding arrangement (a third arrangement), causing a deformation of the crosslinked appliance (Step 712). In presently preferred circumstances, a processor operating suitable software sends instructions or otherwise directs the individual teeth of the reconfigurable mold to move to the relevant arrangement. The movement may be prompted by a user operating a computer or be programmed to occur at least semi-automatically. The mold and appliance are maintained at the second temperature until such time as the sheet has conformed to the shape and orientation of the dental mold in the third arrangement, creating an appliance in a configuration having a third stored geometry corresponding to the third arrangement (Step 714).

The appliance structure and reconfigurable dental mold are maintained in each planned arrangement at the requisite molding temperature for a period of time sufficient to allow for a steady state of crystallization. This period may be dependent on the polymeric material in the appliance and the first molding temperature. In presently preferred implementations, the pressure is decreased subsequently to the rearrangement of the dental mold, or at slower rate than the movement of individual tooth members of the mold in reaching the second arrangement. The tooth members in the reconfigurable mold can be moved between arrangements at any desired rate (e.g., 0.5 mm/min), so long as the velocity does not irreversibly degrade the polymeric material. The process 700 is repeated until the appliance has a configuration representing the desired commencing arrangement and has stored all planned successive arrangements between the commencing arrangement and the target arrangement (Step 716).

Advantageously, the method of manufacturing 700 allows the appliance to accommodate the entire movement path of each tooth moved between the commencing arrangement and the target arrangement. Accommodation of the full path of movement can, in certain circumstances, ensure the force applied to reposition the tooth remains relatively constant between stages, even as the appliance deforms while worn on the patient's dental arch. Furthermore, the use of a single mold with continuous movement reduces manufacturing time and cost, as individual models representing each planned successive arrangement do not have to be created and swapped out at each storage stage. For example, a complete sequence of appliances can be made using only a sufficient amount of polymeric material to form a single tray. The reconfigurable dental mold can also be reused during the course of treatment if the orthodontic practitioner determines that one or more additional intermediate appliances would be best for additional treatment.

Appliances may also be fabricated with special features requested by the practitioner, such as buttons and windows to assist certain teeth movement. For example, buttons and windows may be used to help secure the appliances to the patient's dental arch, and may be used to direct force to move the teeth of the dental arch. For example, if such features are requested, small buttons can be installed on the model teeth in the manufacturing process. A template plastics tray will be made to assist the doctors to place the buttons in a subject's teeth. Appliances can then be fabricated with windows (e.g., small cut-outs) at the location of each prescribed button. In some cases, it may be advantageous to use a multilayer material with one layer providing continuous shape memory properties and the other layer providing enhanced physical properties, such as stiffness and abrasion resistance. In a multilayer system, the elastic recovery force of the shape memory material (e.g., the semicrystalline polymeric material) can be designed to be sufficient to deform the other material at the temperatures of interest, and the relative thicknesses of the two layers can be chosen achieve this balance. The second, non-memory layer can have a transition temperature between use temperature and the transition temperature range of the shape memory polymer to allow it to be deformed by the shape memory material. Suitable methods for design and manufacture of multilayer shell appliances can be found, for example, in U.S. Pat. No. 8,758,009 (Chen et al.).

Manufacturing may include post-processing to remove uncured resin and remove support structures, or to assemble various components, which may also be necessary and could also be performed in a clinical setting.

Treatment Using a Continuous Memory Appliance

Figure 7:
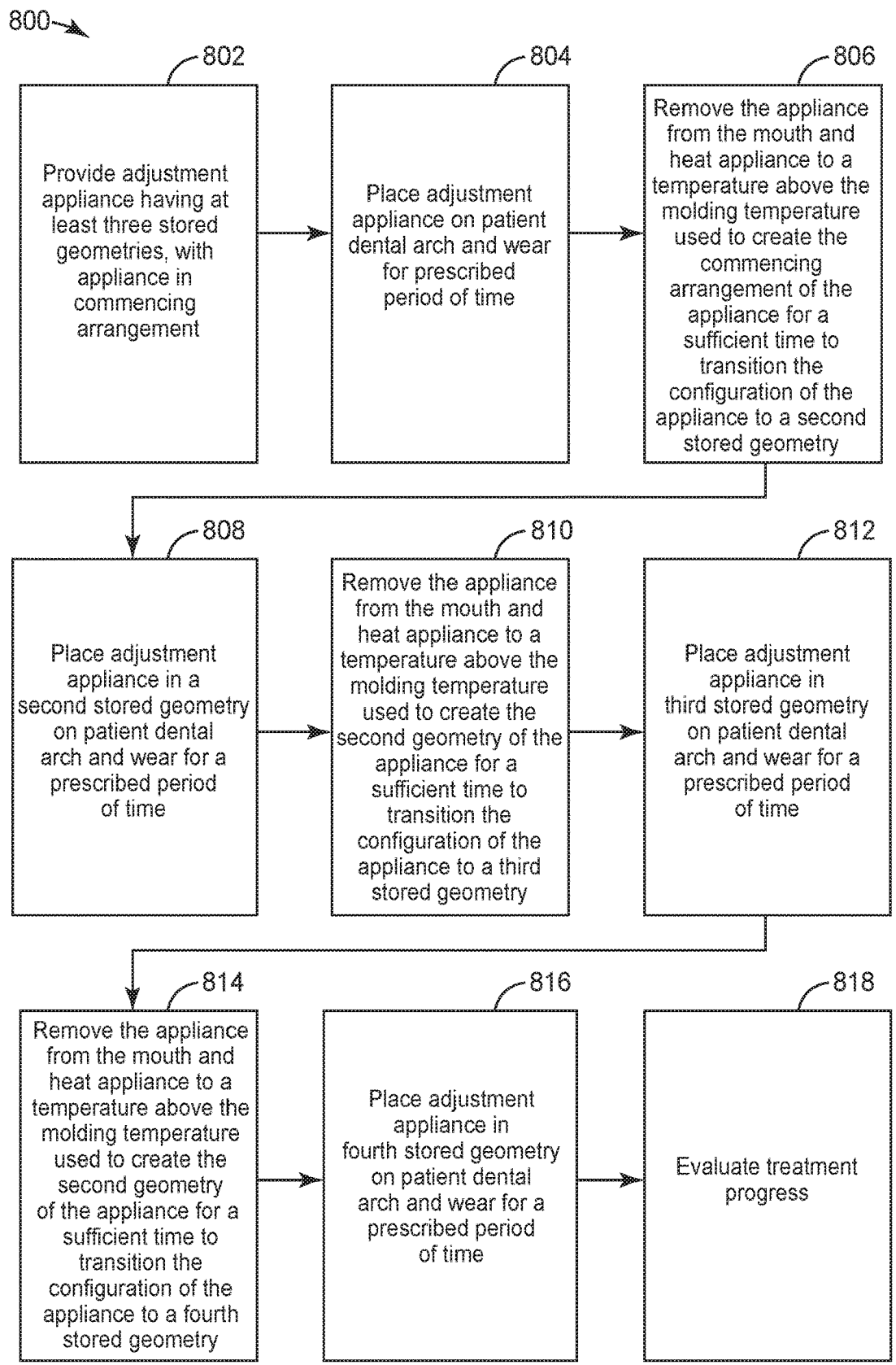
FIG. 7 is a flowchart for treating a patient using a continuous adjustment appliance according to the present disclosure.

Referring now to FIG. 7, a method of treatment 800 using an appliance (particularly a shell appliance) of the present disclosure is depicted. An adjustment appliance having an original shape and at least three stored successive geometries is provided to the patient in the commencing arrangement (Step 802). It should be appreciated that an appliance could be provided having 2 or fewer stored geometries in addition to the original shape, and such embodiments may include one less heating and wear step. Similarly, an adjustment appliance may be provided with more, even considerably more, than three or four stored geometries, in which case the treatment process may include additional heating and wear steps commensurate with the number of stored geometries. In any event, the patient (or practitioner) first places the appliance on his or her dental arch and the appliance is worn for prescribed period of time to define a first wear period (Step 804). At the end of first wear period, the patient (or practitioner) removes the appliance from the mouth and heats appliance to a temperature above the molding temperature used to create the commencing arrangement in the appliance (Step 806). The heating destroys a portion of the formed crystal structures to unlock or transition to a second stored appliance geometry representing a successive intermediate arrangement in the patient's treatment plan. The appliance is then cooled, typically back to room temperature.

While an adequate increase in the temperature of the appliance can be used to selectively destroy crystalline structures in the appliance, an excess increase in temperature can result in the inadvertent partial or complete destruction of a successive stored geometry. Typically, the appliance is heated to no greater than 6° C. above the corresponding molding temperature, in some embodiment no greater than 5, in some embodiments no greater than 3, and in some embodiments not greater than 1° C. above the corresponding molding temperature. In certain typical implementations, the appliance is heated to a temperature of 80° C. to 95° C. to transition to the second stored geometry.

Patient (or practitioner) subsequently places the appliance, now representing the second geometry, on the dental arch and wears the shell for a prescribed period of time (Step 808). At end of prescribed period, the patient (or practitioner) again heats the appliance to a temperature above the molding temperature used to form the appliance in the first successive intermediate arrangement (i.e., the second stored geometry) (Step 810). The heating destroys an additional portion of the formed crystal structures to unlock or otherwise transition to a third stored appliance geometry representing a successive intermediate arrangement in the patient's treatment plan. In certain typical implementations, the appliance is heated to a temperature of 95° C. to 110° C. to transition to the third stored geometry.

The patient (or practitioner) subsequently places the appliance, now representing the third geometry, on the dental arch and wears the shell for prescribed period of time (Step 812). At end of prescribed period, the patient (or practitioner) again heats appliance to a temperature above the molding temperature used to form the appliance in the second successive intermediate arrangement (i.e., the third stored geometry) (Step 814). The heating destroys an additional portion of the formed crystal structures to unlock or otherwise transition to a fourth stored appliance geometry representing the original shape. In certain typical implementations, the appliance is heated to a temperature of 110° C. to 120° C. to transition to the original shape.

Each stored geometry in the appliance can be recovered using heat sources such as a hot air gun, hot plate, steam, conventional oven, infrared heater, radiofrequency (R f) sources or microwave sources. Alternatively, the appliance can be immersed in a heated bath containing a suitable inert liquid (for example, water or a fluorochemical fluid) that will not dissolve or swell the appliance in either its cool or warm states. The appliance can be encased in a plastic pouch or other container which is in turn heated (e.g., electrically), or subjected to one or more of the above-mentioned heating methods. Once heated and held at the appropriate temperature, the appliance is preferably cooled to body temperature (37° C.) or below to lock in the intended configuration and to avoid discomfort or injury.

After wearing the appliance having the fourth stored geometry for a prescribed period of time (Step 816), the patient may return to the practitioner who may evaluate the result of the first iteration of treatment (Step 818). In the event that the first iteration of treatment has resulted in satisfactory final placement of the patient's teeth, the treatment may be ended. However, if the first iteration of treatment did not complete the desired movement of the patient's teeth, one or more additional iterations of treatment may be performed. To begin the next iteration of treatment, the practitioner may taking another scan of the patient's teeth are taken to facilitate the design of the ordered set of removable dental appliances. In some examples, evaluation of the result of the first iteration of treatment may include taking another scan of the patient's teeth, in which case beginning the next iteration of treatment may simply involve forwarding the digital model of the patients teeth to a manufacturing facility so that another adjustment appliance or series of adjustment appliance may be manufactured for the patient based on the new positions of the patient's teeth.

In yet other examples, the newly acquired scan may be used to create one or more iterations of adjustment appliances in the practitioner's facility.

In one or more embodiments that utilize progressive treatment of a patient's teeth, second, third, or more intermediate scans of the teeth can be performed using any suitable technique or combination of techniques. The practitioner or manufacturer can then utilize these intermediate scans to provide one or more additional appliances that are adapted to provide one or more corrective forces to the teeth such that one or more teeth are repositioned to either a subsequent intermediate arrangement or a final target arrangement. Any suitable technique or combination of techniques can be utilized to provide these intermediate scans, models, and arch members, e.g., the techniques described in U.S. Patent Application Publication No. 2010/0260405 (Cinader) and International Publication WO2016/109660 (Raby et al.).

Various techniques of this disclosure may be implemented in a wide variety of computer devices, such as servers (including the Cloud), laptop computers, desktop computers, notebook computers, tablet computers, hand-held computers, smart phones, and the like. Any components, modules or units have been described to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a non-transitory computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device. The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Embodiments

1. A polymeric shell dental appliance for placement on a dental arch comprising a concave trough having a cavity configured to be positioned on a plurality of teeth in the dental arch and having a first approximate shape, wherein the concave trough comprises a crosslinked shape memory polymer, and wherein the crosslinked shape memory polymer is a semicrystalline, non-segmented polymer configured to restore the concave trough to (a) a second approximate shape on application of a first external energy stimulus; and (b) a third approximate shape on application of a second external energy stimulus of a greater magnitude than the first energy stimulus.

2. The polymeric shell dental appliance of embodiment 1, wherein the third approximate shape represents a prescribed final arrangement of the teeth in the dental arch.

3. The polymeric shell dental appliance of embodiment 1, wherein the second approximate shape represents an intermediate arrangement of teeth in the dental arch.

4. The polymeric shell dental appliance of any of the prior embodiments, wherein each external energy stimulus is an increase in temperature.

5. The polymeric shell dental appliance of embodiment 4, wherein each external energy stimulus represents a transition temperature, and wherein each transition temperature is greater than 37° C.

6. The polymeric shell dental appliance of any one of the previous embodiments, wherein the crosslinked shape memory polymer is further configured to restore the concave trough to a fourth approximate shape on application of a fourth external energy stimulus of a greater magnitude than the second or third energy stimuli.

7. The polymeric shell of any of the previous embodiments, wherein the shell includes an outer layer and an inner layer, and wherein the inner layer comprises the crosslinked shape memory polymer.

8. The polymeric shell of any of the previous embodiments, wherein the polymer contains physical crosslinks, chemical crosslinks, or combinations thereof.

9. The polymeric shell appliance of embodiment 1, wherein the semicrystalline polymeric material includes a number of crystalline structures, and wherein a portion of crystalline structures are irreversibly disrupted on application of the first external energy stimulus to transition the shell to the second approximate shape.

10. The polymeric shell appliance of embodiment 9, wherein the remaining portion of crystalline structures are irreversibly disrupted on application of the third external energy stimulus.

11. The polymeric shell appliance of any of the previous embodiments, wherein the polymer includes a crystallization temperature range, and wherein recovery of the second and third approximate shapes occurs when the temperature of the shell is increased to a corresponding temperature within the crystallization temperature range.

12. The polymeric shell appliance of embodiment 11, wherein the semicrystalline polymeric material includes a number of crystalline structures, wherein an increasing number of crystalline structures are irreversibly disrupted as the temperature of the shell is increased through the crystallization temperature range.

13. The polymeric shell appliance of embodiment 12, wherein irreversibly disrupting the crystalline structures changes the approximate shape of the shell, the cavities within the trough, and a combination thereof.

14. The polymeric shell appliance of any of the previous embodiments, wherein crosslinked shape memory polymer is selected from polyethylene, ethylene vinyl acetate, and combinations thereof.

15. A method for manufacturing polymeric shell dental appliances configured to conform to one or more teeth of a patient, the method comprising: providing a first positive model of the patient's dentition, the model representing a repositioned arrangement of the patient's teeth; forming over the model at a first molding temperature a sheet of crosslinkable, crystallizable polymeric material having a crystallization temperature range having an upper limit and a lower limit; crosslinking the polymer to create an appliance having a first stored geometry; providing a second model representing a first intermediate arrangement of the patient's teeth, the arrangement including one or more teeth in different orientations than the first model; subjecting the appliance to a second molding temperature within the crystallization temperature range and being less than the first molding temperature to create a shell having a second stored geometry; providing a third model representing a second intermediate arrangement of the patient's teeth, the second arrangement including one or more teeth in different orientations than the first intermediate arrangement; subjecting the appliance to a third molding temperature within the crystallization temperature range to create a third stored geometry, the third molding temperature being less than either the first or second molding temperatures; and cooling the shell below the lower limit of transition temperature range.

16. The method of embodiment 15, wherein the shape memory material is selected from polyethylene, ethylene vinyl acetate, and combinations thereof.

17. The method of embodiment 15 or 16, wherein heating the sheet comprises heating for a period of time sufficient to selectively melt at least portion of the crystalline structures in the shape memory material.

18. The method of any of the previous embodiments, wherein the shape memory material is physically crosslinkable, chemically crosslinkable, or combinations thereof.

19. The method of any of the previous embodiments and further comprising subjecting the appliance in the first stored geometry to irradiation to create a number of chemical crosslinks in the shape memory material.

20. The method of embodiment 19, wherein the irradiation is selected from gamma, E-beam, and combinations thereof.

21. The method of any of the previous embodiments, and further comprising:
creating a first series of crystalline structures in the shape memory polymer while the shell has the second stored geometry.

22. The method of any of the previous embodiments, wherein the first model comprises a plurality of reconfigurable tooth models arranged relative to a physical arch, and wherein providing the second model comprises moving at least one of the tooth objects to create the second arrangement.

23. The method of embodiment 22, wherein moving at least one of the tooth objects comprises moving the tooth object along a treatment path.

24. The method embodiment 23, and further comprising placing the first model within a temperature controlled chamber and reducing the temperature in the chamber from the first molding temperature to the second molding temperature, and wherein the tooth model is moved along the treatment path segment while the temperature in the chamber is reduced from the first molding temperature to the second molding temperature.

25. The method of any of the previous embodiments, wherein the forming a sheet of polymeric material over the model includes the act of applying pressure to the model.

26. The method of embodiment 25, wherein the forming a sheet of crosslinkable polymeric material over the model includes the act of applying pressure to the model, and wherein the tooth model is moved along the treatment path segment while the pressure is applied to the model.

27. The method of any of the previous embodiments, wherein the polymeric material forms an increasing number of crystalline structures as the temperature is reduced from the upper limit of the crystallization temperature range to the lower limit.

28. The method of any of the previous embodiments, wherein the steps of providing the first, second, and third positive models each comprise providing a printed model of the dentition representing the desired arrangement of the patient's teeth.

29. The method of any of the previous embodiments, wherein each molding temperature is greater than 37° C.

30. A method of moving a patient's teeth of a target arrangement, the method comprising: placing an orthodontic appliance having a first configuration on a dental arch, the orthodontic appliance comprising a crosslinked, semicrystalline shape memory polymer having a number of crosslinks and crystalline structures; heating the appliance to a first transition temperature so as to modify the shape of the shell to a second configuration; placing the appliance in the second configuration on the dental arch; heating the appliance to a second transition temperature so as the modify the shape of the shell to a third configuration; placing the appliance in the third configuration on the dental arch; the third configuration shaped to reposition the patient's teeth to the target arrangement.

31. The method of embodiment 30, wherein heating the appliance to a first transition temperature disrupts a portion of the crystalline structures in the shape memory polymer.

32. The method of embodiment 31, wherein heating the appliance to a second transition temperature disrupts at least a portion of the remaining crystalline structures in the shape memory polymer.

33. The method of embodiments 30-32, wherein the appliance comprises a shell that includes an inner cavity including a plurality of receptacles, and wherein heating the polymeric shell to a first transition temperature so as to modify the shape of the shell to a second configuration comprises modify the position of at least one receptacle within the cavity.

34. The method of embodiments 30-33, wherein the first transition temperature is about 80° C.

35. The method of embodiments 30-34, wherein the third transition temperature is about 120° C.

All of the patents and patent applications mentioned above are hereby expressly incorporated by reference. The embodiments described above are illustrative of the present invention and other constructions are also possible. Accordingly, the present invention should not be deemed limited to the embodiments described in detail above and shown in the accompanying drawings, but instead only by a fair scope of the claims that follow along with their equivalents.

The invention claimed is:

1. A method for manufacturing polymeric shell dental appliances configured to conform to one or more teeth of a patient, the method comprising:
providing a first positive model of the patient's dentition, the model representing a repositioned arrangement of the patient's teeth;
forming over the model at a first molding temperature a sheet of crosslinkable, crystallizable polymeric material having a crystallization temperature range having an upper limit and a lower limit; crosslinking the polymer to create a first appliance having a first stored geometry;
providing a second model representing a first intermediate arrangement of the patient's teeth, the first intermediate arrangement including one or more teeth in different orientations than the first model;
subjecting the appliance in the first stored geometry to a second molding temperature within the crystallization temperature range and being less than the first molding temperature to create a second stored geometry in the appliance;
providing a third model representing a second intermediate arrangement of the patient's teeth, the second intermediate arrangement including one or more teeth in different orientations than the first intermediate arrangement;
subjecting the appliance in the second stored geometry to a third molding temperature within the crystallization temperature range to create a third stored geometry, the third molding temperature being less than either the first or second molding temperatures; and cooling the appliance below the lower limit of transition temperature range.

2. The method of claim 1, wherein the crosslinkable, crystallizable polymeric material is selected from polyethylene, ethylene vinyl acetate, and combinations thereof.

3. The method of claim 1, wherein heating the sheet comprises heating for a period of time sufficient to selectively melt at least portion of the crystalline structures in the crosslinkable, crystallizable polymeric material.

4. The method of claim 1, wherein the crosslinkable, crystallizable polymeric material is physically crosslinkable, chemically crosslinkable, or combinations thereof.

5. The method of claim 1 and further comprising subjecting the appliance in the first stored geometry to irradiation to create a number of chemical crosslinks in the crosslinkable, crystallizable polymeric material.

6. The method of claim 5, wherein the irradiation is selected from gamma, E-beam, and combinations thereof.

7. The method of claim 1, and further comprising:
creating a first series of crystalline structures in the crosslinkable, crystallizable polymeric material while the shell has the second stored geometry.

8. The method of claim 1, wherein the first mold comprises a plurality of reconfigurable tooth objects arranged relative to a physical arch, and wherein providing the second model comprises moving at least one of the tooth objects to create the second arrangement.

9. The method of claim 8, wherein moving at least one of the tooth objects comprises moving the tooth object along a treatment path.

10. The method claim 9, and further comprising placing the first model within a temperature controlled chamber and reducing the temperature in the chamber from the first molding temperature to the second molding temperature, and wherein the tooth model is moved along the treatment path segment while the temperature in the chamber is reduced from the first molding temperature to the second molding temperature.

11. The method of claim 1, wherein the forming a sheet of polymeric material over at least one of the first, second, and third model includes the act of applying pressure to the respective model.

12. The method of claim 11, wherein the forming a sheet crosslinkable polymeric material over at least one of the first, second, and third model includes the act of applying pressure to the respective model, and wherein a tooth object is moved along a treatment path segment while the pressure is applied to the respective model.

13. The method of claim 1, wherein the crosslinkable, crystallizable polymeric material forms an increasing number of crystalline structures as the temperature is reduced from the upper limit of the crystallization temperature range to the lower limit.

14. The method of claim 1, wherein the steps of providing the first, second, and third positive models each comprise providing a printed model of the dentition representing the desired arrangement of the patient's teeth.

15. The method of claim 1, wherein each molding temperature is greater than 55° C.

16. The method of claim 1, wherein crystallization temperature range is about 60° C. to about 135° C.

17. The method of claim 1, wherein the crosslinkable, crystallizable polymeric material is a semicrystalline, non-segmented polymer.

18. A method of moving a patient's teeth of a target arrangement, the method comprising: placing an orthodontic appliance created according to the method of claim 1 on a dental arch; heating the appliance to a first transition temperature so as to modify the shape of the shell to a second configuration; placing the appliance in the second configuration on the dental arch; heating the appliance to a second transition temperature so as to the modify the shape of the shell to a third configuration; placing the appliance in the third configuration on the dental arch; the third configuration shaped to reposition the patient's teeth to the target arrangement.

19. The method of claim 18, whererein the appliance includes crystalline structures in the polymeric material, and wherein heating the appliance to a first transition temperature disrupts a portion of the crystalline structures in the polymeric material.

20. The method of claim 18, wherein the appliance comprises a shell that includes an inner cavity including a plurality of receptacles, and wherein heating the polymeric shell to a first transition temperature so as to modify the shape of the shell to a second configuration comprises modifying the position of at least one receptacle within the cavity.

* * * * *

UNITED STATES PATENT AND TRADEMARK OFFICE
CERTIFICATE OF CORRECTION

PATENT NO. : 11,478,335 B2  
APPLICATION NO. : 16/907877  
DATED : October 25, 2022  
INVENTOR(S) : Ming-Lai Lai et al.

Page 1 of 1

It is certified that error appears in the above-identified patent and that said Letters Patent is hereby corrected as shown below:

In the Claims

Column 24  
Line 55, In Claim 8, delete "first mold" and insert -- first model --, therefor.  
Line 63, In Claim 10, after "method", insert -- of --.

Column 26  
Line 15 (approx.), In Claim 19, delete "whererein" and insert -- wherein --, therefor.

Signed and Sealed this  
Eleventh Day of July, 2023

Katherine Kelly Vidal  
*Director of the United States Patent and Trademark Office*